(12) United States Patent
Gerchman et al.

(10) Patent No.: US 8,079,723 B2
(45) Date of Patent: Dec. 20, 2011

(54) ADJUSTABLE LENS WITH SELF-ILLUMINATED SCALE

(75) Inventors: Mark Craig Gerchman, Keene, NH (US); Alan Coleman, Narborough (GB); Nigel Antony Ayres, Whetstone (GB)

(73) Assignee: Cooke Optics Limited, Leicester (GB)

( * ) Notice: Subject to any disclaimer, the term of this patent is extended or adjusted under 35 U.S.C. 154(b) by 476 days.

(21) Appl. No.: 12/380,374

(22) Filed: Feb. 26, 2009

(65) Prior Publication Data

US 2009/0219707 A1    Sep. 3, 2009

Related U.S. Application Data

(60) Provisional application No. 61/067,631, filed on Feb. 28, 2008.

(51) Int. Cl.
*G01D 11/28* (2006.01)
(52) U.S. Cl. .............................................. 362/5; 362/23
(58) Field of Classification Search ................. 362/5, 23, 362/26, 27, 29, 30
See application file for complete search history.

(56) References Cited

U.S. PATENT DOCUMENTS

| 3,094,911 A | * | 6/1963 | Reiche et al. | 396/296 |
| 4,183,661 A | | 1/1980 | Ohkura | |
| 5,664,860 A | * | 9/1997 | Berardi | 362/23 |

* cited by examiner

*Primary Examiner* — David V Bruce
(74) *Attorney, Agent, or Firm* — Robert L. Epstein; Epstein Drangel LLP

(57) ABSTRACT

An adjustable lens with a self-illuminating scale for use in photography, cinematography, or videography has a housing surface with scale markings and an opaque member with a reference marking mounted over and movable relative to the surface. The movement of the member normally adjusts a parameter of the lens. The scale markings are visible through a window in the member. The edge of the member adjacent the scale has an opening. A light source is situated within a recess in the member adjacent the opening. Light is directed from the light source through the edge opening in a direction along the surface of the surface such that the visible scale markings are illuminated, while light from the light source is otherwise substantially prevented from escaping from the lens. The activation and intensity of the light source is controlled by movement of the member or an external illumination controller.

33 Claims, 9 Drawing Sheets

Low Light Conditions

To Power Source

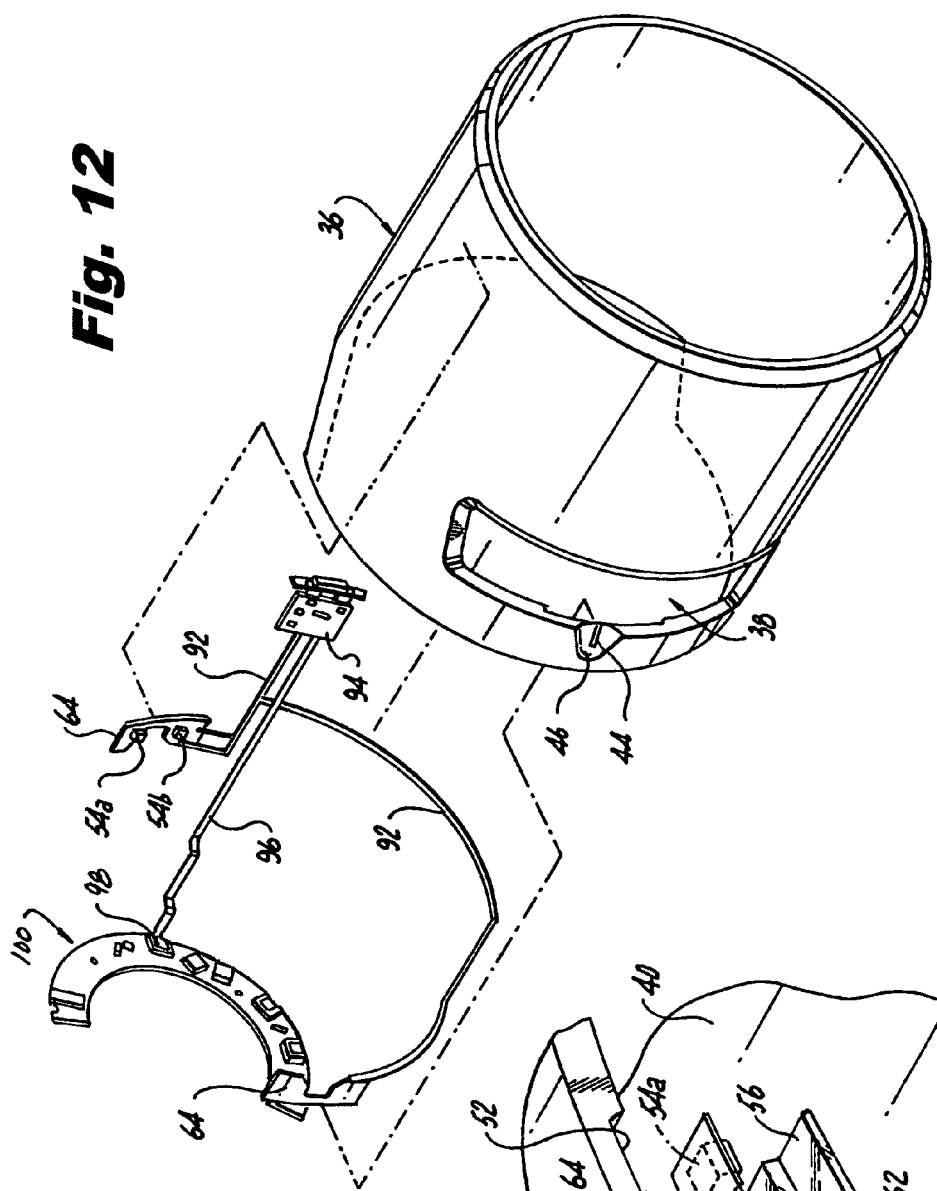
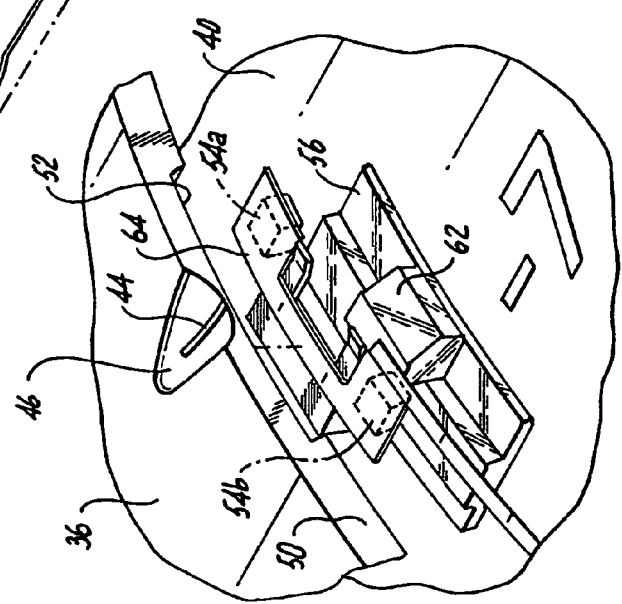

ADJUSTABLE LENS WITH SELF-ILLUMINATED SCALE

CROSS-REFERENCE TO RELATED APPLICATIONS

Priority is claimed on Provisional Patent Application Ser. No. 61/067,631 filed Feb. 28, 2008.

STATEMENT REGARDING FEDERALLY SPONSORED RESEARCH OR DEVELOPMENT

Not Applicable

REFERENCE TO A "SEQUENCE LISTING", A TABLE, OR A COMPUTER PROGRAM LISTING APPENDIX SUBMITTED ON COMPACT DISC

Not Applicable

BACKGROUND OF THE INVENTION

1. Field of the Invention

The present invention relates to adjustable lenses for use in general photography, cinematography and videography and more particularly for such a lens with a self-illuminated scale.

2. Description of Prior Art Including Information Disclosed Under 37 CFR 1.97 and 1.98

The present invention addresses the problem of the lack of visibility in low or nonexistent light conditions of the markings on a lens body that show the position of the iris, focus, zoom or other appropriate scales and markings. To provide images of sufficient quality, lenses have to be adjusted by the users to control focus settings, aperture adjustments, and (for the case of zoom lenses) focal length settings. To aid the user in the adjustment process, lenses are typically marked with a set of adjustable scales so that the user can adjust the settings by aligning scale marks situated on a movable part of the lens with fiducials on an adjacent stationary part of the lens. Our invention improves the visibility of lens markings and provides assistance for the user in aligning the scale markings with the fiducial marks.

Traditional approaches to making lens scales and markings more visible have been to use markings with special characteristics; these include oversize markings, the use of contrasting colors, and the use of luminescent materials (including fluorescent, phosphorescent, and radio luminescent paints). The last materials have been used in an attempt to improve visibility in low light level conditions. Occasionally the use of an external lamp has been employed to aid the photographer/cinematographer in clearly seeing the position of lens scales and markings.

However, the use of photoluminescent paints has the drawback that such paints continue to glow even when not needed and thus need to be shielded to prevent casting stray light that can adversely effect the image produced by the lens. Radioluminescent paints are no longer used because of the health hazards.

The use of external viewing lamps is contraindicated because they can block the markings from certain angles. Further, such lamps occupy critical space around the operators' working space and have to be powered externally.

Using bright color engravings on matte black backgrounds and large numerals improve the visibility of the markings somewhat. Additionally, it is advantageous to provide a window in the focus scale cover so that while the focus scale rotates on average 300 degrees, the window only permits viewing of the nearest 60 degrees of marks to draw attention to the correct portion of the focus scale. However, these approaches do not improve the situation sufficiently under many conditions.

Our invention is fundamentally different in that our lens self-illuminates its own scales and markings. It does this without allowing any significant amount of light to escape from the lens housing. Accordingly, the scales are illuminated without interfering in any way with the quality of the images being taken.

We are aware U.S. Pat. No. 4,183,661 issued Jan. 15, 1980 to Ohkura. That patent discloses a scale illuminating mechanism for an enlarger lens system. Thus, it relates to lenses of a different type than involved here. Further, that mechanism is intended only for illumination of the iris control.

BRIEF SUMMARY OF THE INVENTION

The lens of our invention uses the electrical power in the lens to illuminate a light source that is integral to the lens housing. The light can originate from any number of light sources (including, but not restricted to, light emitting diodes, discharge lamps, lasers, infrared lamps) and is directed to illuminate the lens scales and markings by features integral to the lens housing. The direction of the illumination can be accomplished by, but not limited to, light pipes, fiber optics, light path channels, mirrors and appropriate baffles/barriers to control the illumination. In this fashion, the relevant features of the lens' scales and markings can be illuminated for better visibility, without adding unwanted light to the subject or scene to be rendered.

In addition, the present invention includes methods for adjusting the integral self-illuminating system to satisfy the requirements and preference of the photographer/cinematographer. Because external illumination can be occasionally detrimental to the photographic/cinemagraphic process, it is necessary to be able to control the intensity of the illumination. In addition to controlling the illumination by the use of switches and controls both integral and/or remote, the illumination may be controlled using the adjustable lens scales and internal software within the lens to allow the user to control the intensity of the illumination and when required turn the system on and off.

It is, therefore, a prime object of the present invention to provide an adjustable lens with a self-illuminating scale.

It is another object of the present invention to provide an adjustable lens with a self-illuminating scale which prevents the light used to illuminate the scale from degrading the images produced by the lens.

It is another object of the present invention to provide an adjustable lens with a self-illuminating scale that can utilize different types of light sources.

It is another object of the present invention to provide an adjustable lens with a self-illuminating scale in which the light source is hidden under the focus scale cover.

It is another object of the present invention to provide an adjustable lens with a self-illuminating scale wherein the light from the light source can be directed to the window by different types of light directing elements.

It is another object of the present invention to provide an adjustable lens with a self-illuminating scale wherein the light directing element is situated within the focus scale cover.

It is another object of the present invention to provide an adjustable lens with a self-illuminating scale in which the activation and intensity of the light can be controlled.

It is another object of the present invention to provide an adjustable lens with a self-illuminating scale in which the activation and intensity of the light can be controlled by manipulating the parts of the lens.

It is another object of the present invention to provide an adjustable lens with a self-illuminating scale in which the activation and intensity of the light can be controlled by manipulating the iris adjustment of the lens.

It is another object of the present invention to provide an adjustable lens with a self-illuminating scale in which the activation and intensity of the light is controlled by an external illumination controller.

In general, the above objects are achieved by the present invention which is directed to an adjustable lens with a self-illuminating scale for use in photography, cinematography, or videography of the type connected to an electrical power source. The lens includes a scale having a surface bearing scale markings moveable to adjust a parameter of the lens and a stationary opaque cover member with a reference marking mounted over the scale. The cover member has a portion at least partially defined by an edge and through which the scale markings are visible. The edge extends in a direction generally away from the scale surface and has an opening. A recess is situated under the cover member, adjacent the edge. A light source is situated within the recess. Means are provided for connecting the light source and the power source to energize the light source. Means are provided for directing light from the light source through the edge opening in a direction along the scale surface such that the visible scale markings are illuminated by the light source, while light from the light source is otherwise substantially prevented from escaping from the cover member.

The connecting means includes means for controlling the intensity of light from the light source. In one preferred embodiment, the controlling means includes a rotatable ring which normally functions to control a parameter of the lens. The movement of the ring changes the function of the ring to control the intensity of the light from the light source.

Preferably, the scale is the focus scale, the cover member is the focus cover and the ring is the iris ring.

The ring normally functions as the aperture adjustment. The movement of the ring also changes the function of the ring to control the activation of the light source.

The parameter controlled by the movement of the scale is different from the parameter normally controlled by the ring.

The cover member portion may take the form of a cut-away portion or a window.

The light source may take the form of an LED or an incandescent bulb.

The directing means may take the form of a transparent plastic element, a light pipe, an optical fiber or a light channel.

The light directing means preferably includes an inclined interior surface

The connecting means includes switch means interposed between the power source and the light source. The switch means may be external to the lens and include a potentiometer.

Alternatively, the switch means may be internal to the lens and be controlled by the movement of ring.

The switch means may be external to the lens or a part of the lens.

The movement of the ring in a particular manner changes the function of the ring between adjusting a parameter of the lens and controlling the intensity of the light source. The movement of the ring in a particular manner may also activate the light source.

The lens also includes a light conducting epoxy member interposed between the light directing means and the cover member in alignment with the reference marking so as to illuminate the reference marking. Preferably, the reference marking is situated in a recess in the cover member.

The internal switch means includes a part moveable with the ring. The connector has one end attached to the part and a second end. An arcuate processor board with a plurality of contact pads spaced along the surface thereof is provided. The second end of the connector is moved along the contact pads as the ring is moved, to control the light source.

The external switch means includes a microprocessor controlled by a potentiometer to adjust the intensity of the light source.

The lens may also include multiple light sources. The external switch means includes a microprocessor controlled by a selector switch to select one or both of the light sources.

Alternatively, in the internal switch means embodiment, the ring may be movable to select one or both of the light sources.

BRIEF DESCRIPTION OF THE SEVERAL VIEWS OF DRAWINGS

To these and to such other objects that may hereinafter appears, the present invention relates to an adjustable lens with self-illuminating scale as described in detail in the following specification and recited in the annexed claims, taken together with the accompanying drawings, in which like numerals refer to like parts and in which:

FIG. 5 is an exploded perspective view of the light source and light guide;

FIG. 12 is a perspective view of the processor board, connecter board and focus illuminator;

Figure 11:
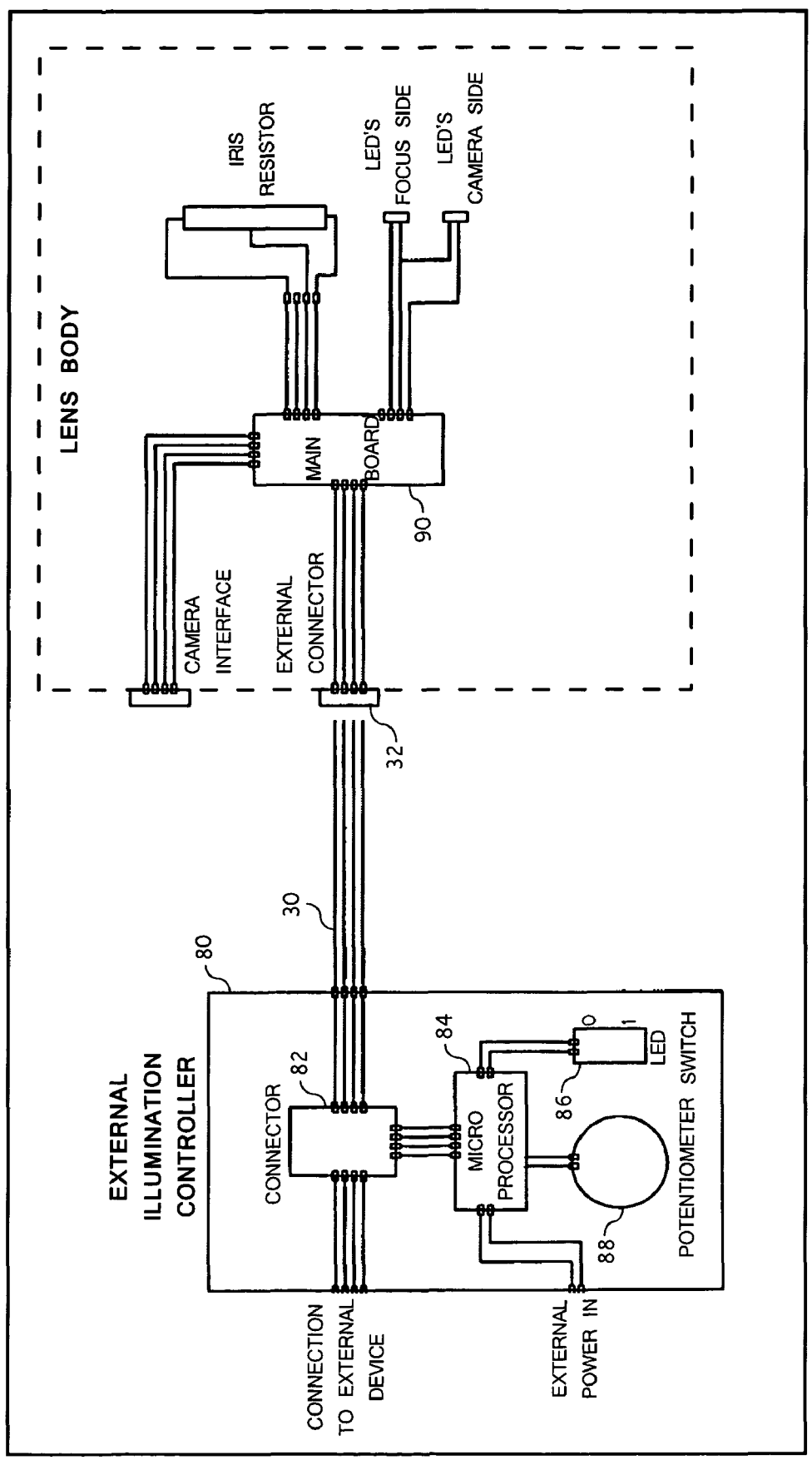
FIG. 11 is a block diagram of the lens body electronics and external illumination controller.
Figure 14A:
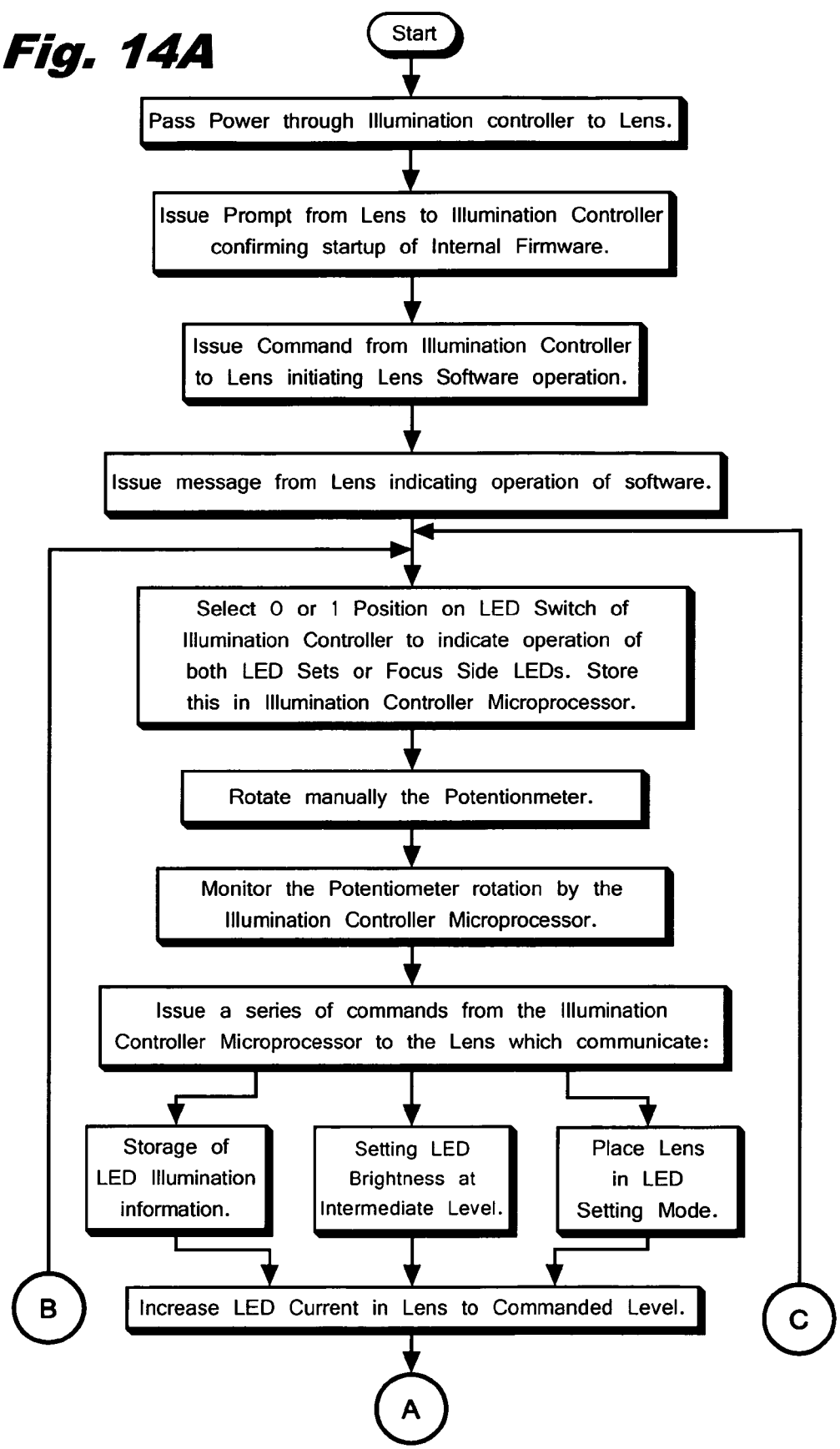
Figure 14B:
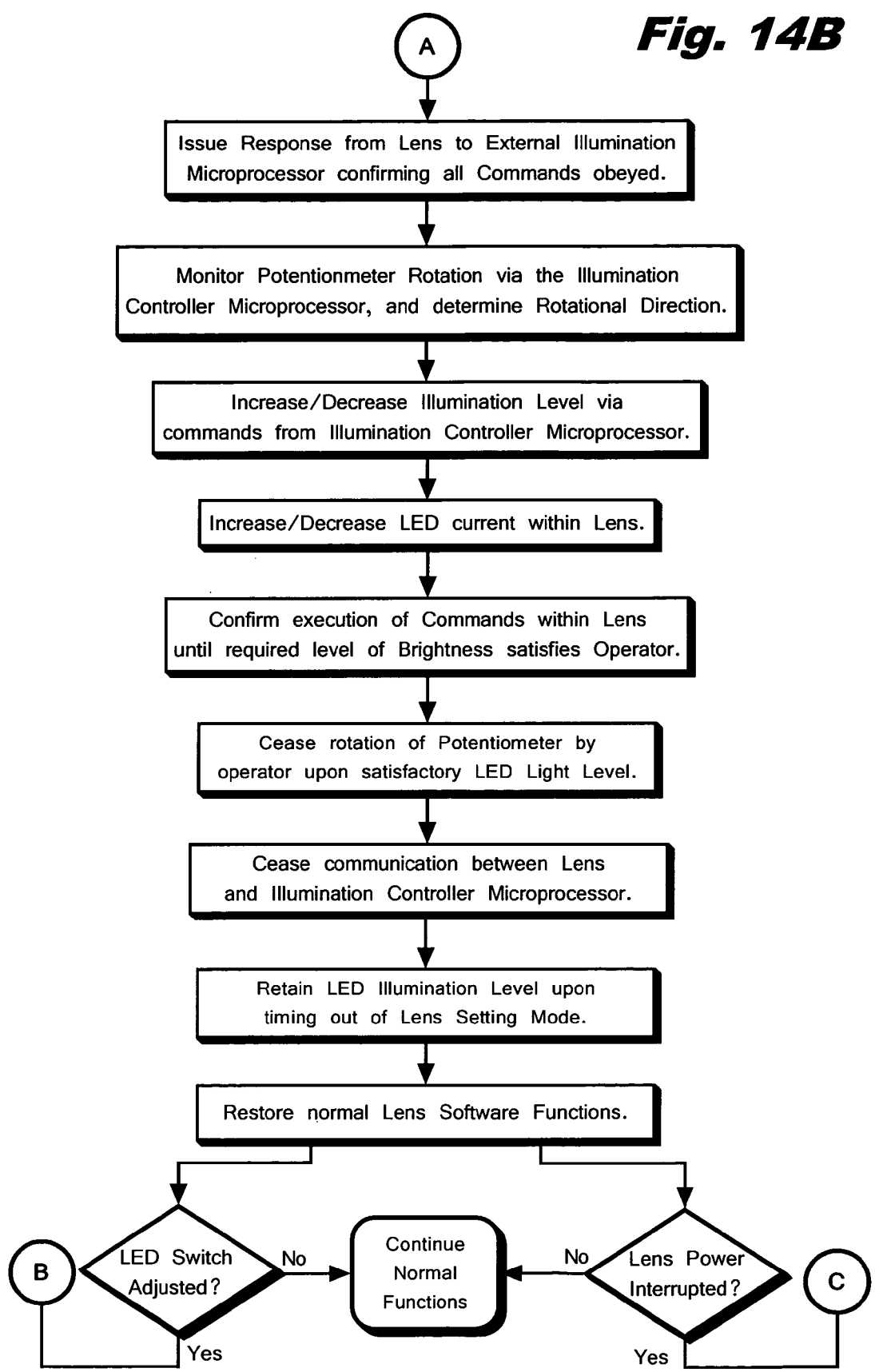

FIGS. 14A and 14B together form a flowchart of the operation of the electronics of FIG. 11.

DETAILED DESCRIPTION OF THE INVENTION

Figure 1:
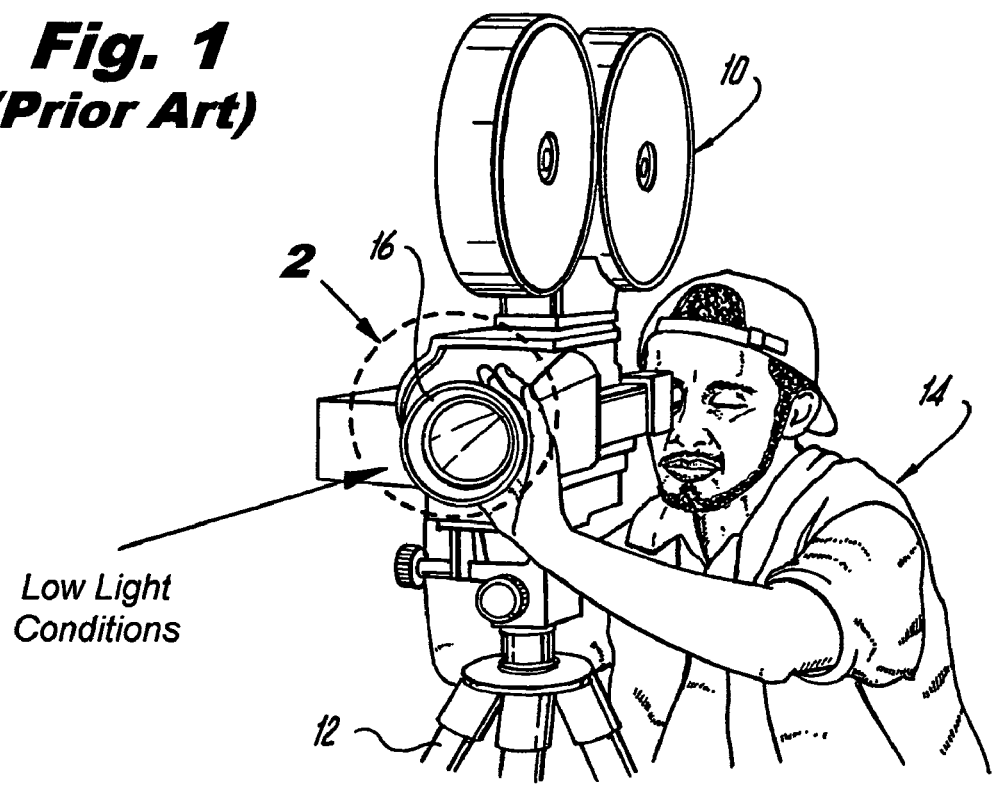
FIG. 1 is an environmental view showing a camera with a prior art lens as it would be used to produce cinematographic, videographic or general photographic images by a cameraman in a low light situation.
Figure 2:
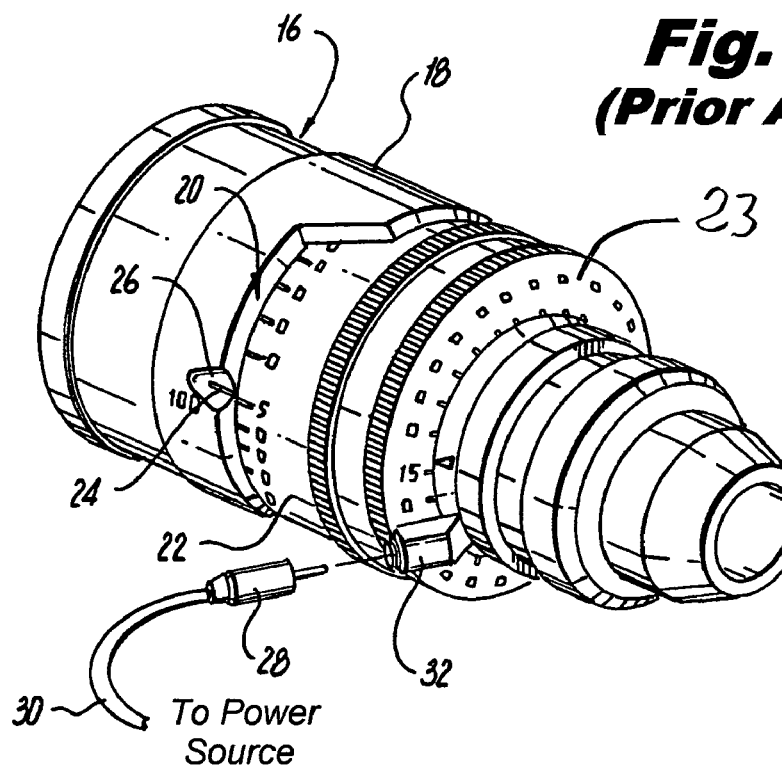
FIG. 2 is a larger perspective view of the prior art lens of FIG. 1.

FIGS. 1 and 2 illustrate a camera with a conventional electric adjustable lens being used in a low light condition to produce cinematographic, videographic and general photographic images. The camera 10 is shown as mounted on a tripod 12, operated by a cameraman 14. In some instances, a different individual may be responsible for adjusting the lens parameters to the necessary settings as the images are formed. However, whoever is making the lens adjustments, it is necessary that the scales be visible to permit same to be accomplished accurately.

The lens 16 has a focus scale cover 18 shaped in a conventional manner. It has a rearward facing edge 20 that defines a cut-away section of the cover which reveals the numbers on the adjacent focus scale 22 located under the focus cover. On the surface of the focus cover, proximate the cut-away section, is the reference line 24. Reference line 24 is situated in a generally triangular shaped recess 26 which is inclined toward focus scale 22. This permits the reference line to be accurately aligned with the focus scale numbers because the end of the reference line is almost at the same level as the scale numbers.

FIG. 2 also shows the electrical connection to lens 10. The electrical connection consists of a connector 28 connected by power cable 30 to a power supply (not shown). A socket 32 on the lens body is provided to receive connector 28.

Adjustable scales for other parameters, such as the iris setting, are also shown on the lens of FIG. 2. Those other scales also have rings or covers and scales that are moveable relative to each other to adjust the parameter, as necessary.

Figure 3:
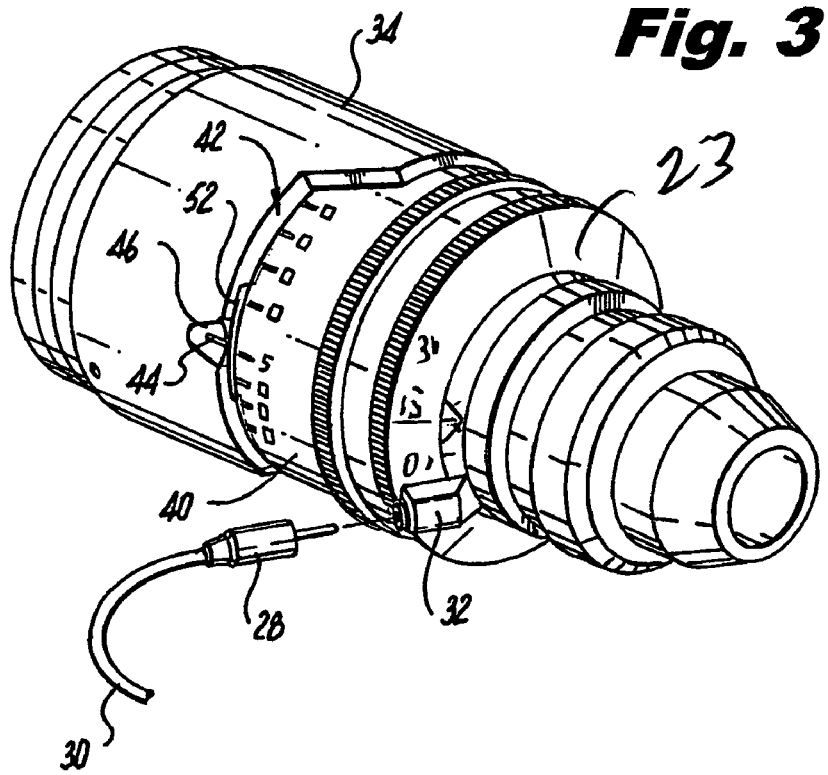
FIG. 3 is a perspective view of the lens of the present invention, with a conventionally shaped focus collar having a cut-away section.
Figure 4:
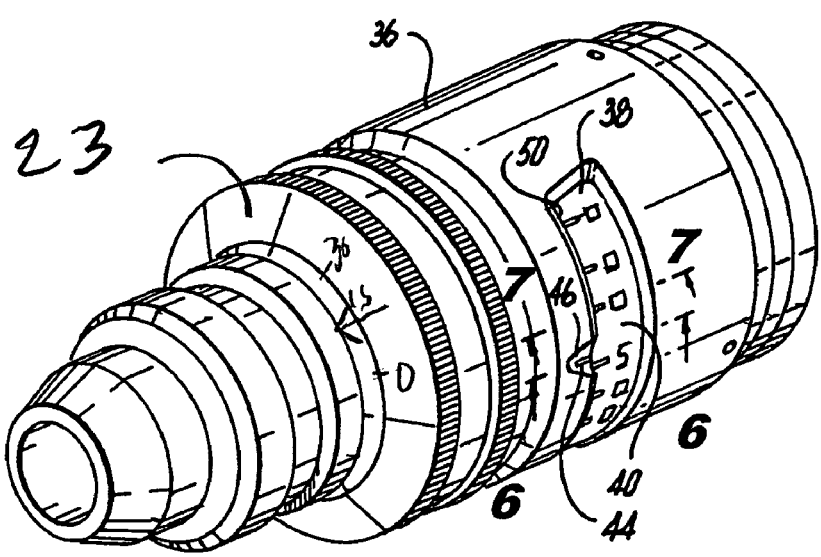
FIG. 4 is a perspective view of the lens of the present invention, with a focus collar having a scale window.

FIGS. 3 and 4 respectively show two versions of the self-illuminated lens of the present invention. The lens illustrated in FIG. 3 has a conventionally shaped focus scale cover 34. The focus scale cover 36 of the lens illustrated in FIG. 4 has a window 38 through which focus scale 40 is visible.

Focus scale cover 34 of FIG. 3 has a rearward facing edge 42 that defines a cut-away section which reveals the numbers on the adjacent focus scale 40 located under the focus scale cover. On the surface of focus scale cover 34, proximate the cut-away section, is the reference line 44. Reference line 44 is situated in a generally triangular shaped recess 46 which is inclined toward focus scale 40. Recess 46, like recess 26 of ring 18, is inclined to permit reference line 44 to be accurately aligned with the numbers on focus scale 40, because the end of the reference line is almost at the same level as the scale numbers.

The window 38 of the iris ring 36 of the lens of FIG. 4 is partially defined by an edge 50. Window 38 reveals the numbers on the adjacent focus scale 40 located under the focus scale cover. On the surface of focus scale cover 36, proximate edge 50 of window 38, is the reference line 44.

As with the lenses of FIGS. 2 and 3, reference line 44 is situated in a generally triangular shaped recess 46 which is inclined toward scale 40. Recess 46 is inclined to permit reference line 44 to be accurately aligned with the numbers on scale 40, because the end of the reference line is almost at the same level as the scale numbers.

FIG. 3 also shows the connector 28, cable 30 and socket 32 of the power source connection. The same elements may exist on the lens of FIG. 4 but are not shown because the lens may receive power from the camera itself, instead of from an external source.

Particular attention is directed to the elongated opening 52 in edge 42 of ring 34 that is situated immediately beneath the rearward facing edge of recess 46. The same opening 52 is present in edge 50 of window 38 of FIG. 4 but is not visible in that figure because edge 50 faces the front of the lens.

Figure 6:
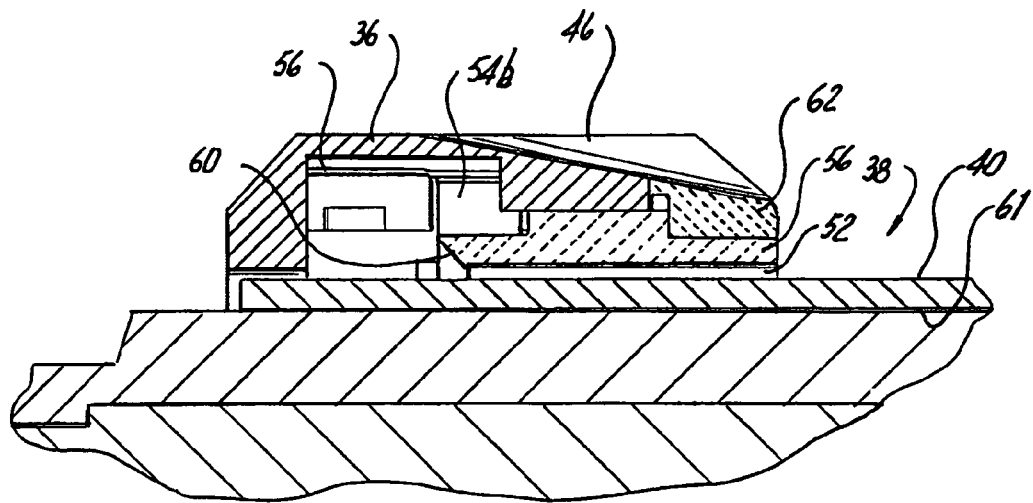
FIG. 6 is a cross-sectional view of a first preferred embodiment of the illumination means of the present invention taken along line 6-6 of FIG. 4.
Figure 7:
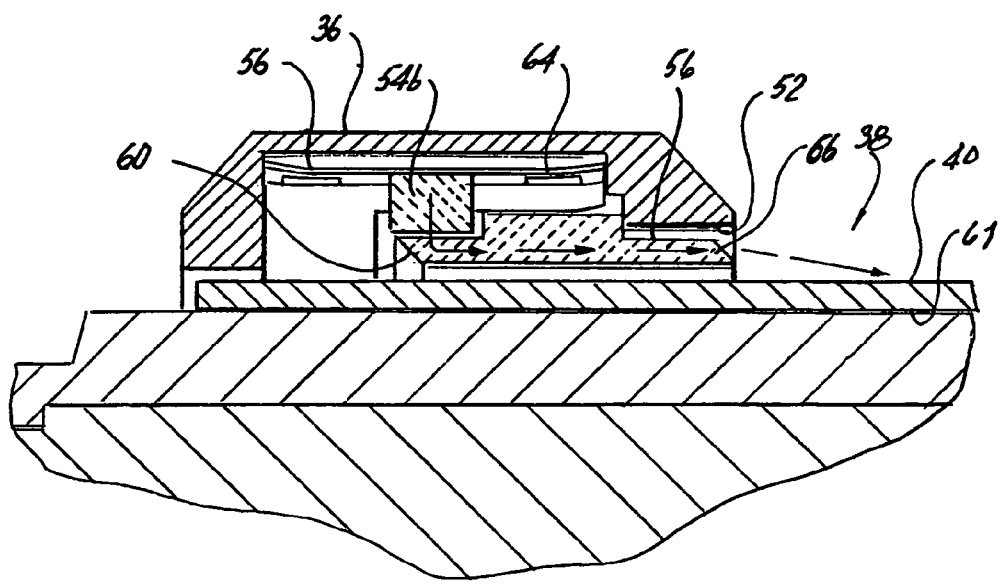
FIG. 7 is a cross-sectional view of a first preferred embodiment of the illumination means of the present invention taken along line 7-7 of FIG. 4.

FIGS. 5, 6 and 7 illustrate a first preferred embodiment of the illuminating means of the present invention. While it is possible to use a single set of two light sources 54a and 54b to illuminate the focus scale, it is preferred to use includes first and second sets of two light sources, each consisting of two light sources 54a and 54b. The sets of light sources can be used to illuminate opposing sides of a single scale window or the sets of light sources can also be used to illuminate separate scales. It is also possible to use additional light sources, if desired.

The light sources 54a, 54b shown in these figures each take the form of a light emitting diode (LED), which are well known in the art. Each set of light sources is mounted on the underside of one of two different circuit boards 64 (see FIG. 12) made of flexible material. The LEDs are situated above the light receiving end of a plastic light guide 58. The light emitting end of the light guide extends though opening 52 in ring 36 so as to illuminate the adjacent scale 40.

The light receiving end of light guide 58 that is aligned with light source 54 has a surface 60 that is inclined approximately 45° relative to the axis of the lens. Surface 60 of the light guide reflects and redirects light from the light source 54 through the body of light guide 58. The light is directed onto the scale in a direction substantially parallel to the axis of the lens. The light travels to and out the light emitting end of light guide 58 that extends through opening 52.

Surface 66 the light emitting end of light guide 58 is itself inclined, as seen in FIG. 7. The inclined surface causes the light exiting the light guide to be angled toward the surface of scale 40.

Scale 40 is preferably manufactured from aluminum or Perspex, and has characters engraved and filled with fluorescent paint. Scale 40 is quite thin and is situated above a black anodized surface 61 which reduces light loss and improves character contrast.

As seen in FIG. 6, immediately under recess 46 of focus cover 36 and above light emitting end of light guide 58, is a member 62, formed of light transmitting epoxy. Member 62 conducts light from the light emitting end of the light guide to the reference line 44 at within recess 46 to illuminate the reference line.

Figure 8:
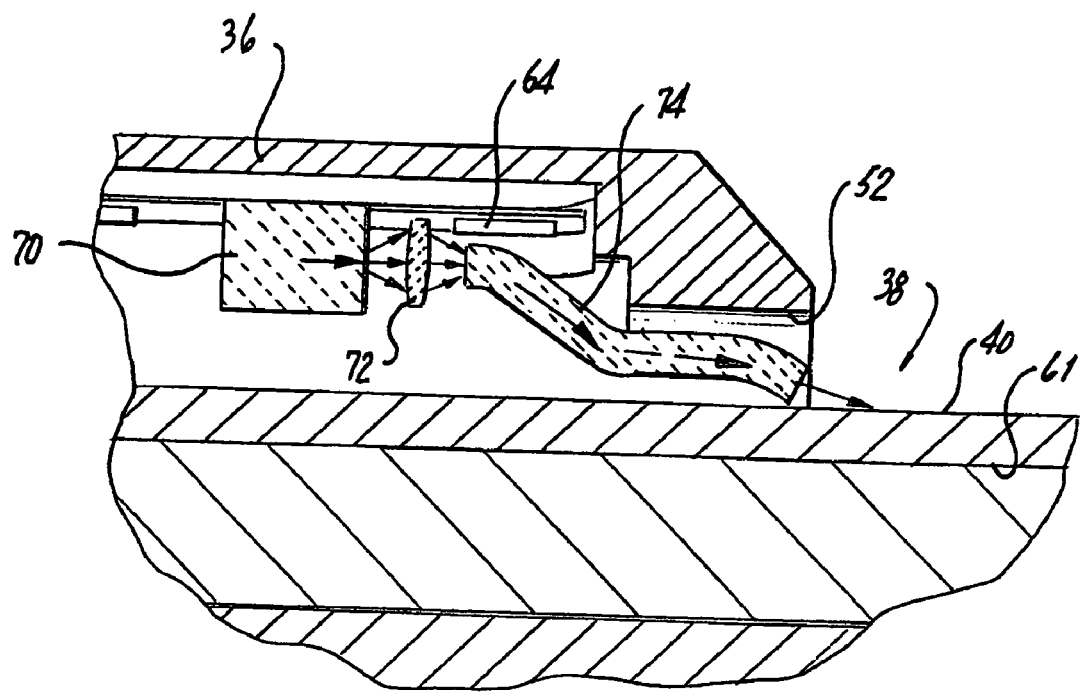
FIG. 8 is a view similar to FIG. 7 showing a second preferred embodiment of the illumination means of the present invention.

FIG. 8 illustrates the second preferred embodiment of the invention in which the light sources take the form of a side emitting LED or a small incandescent bulb 70. Light source 70 emits light in the direction of lens 72. Lens 72 focuses the light into the receiving end of one or more optical fibers 74, only one of which is illustrated. The emitting end of fiber 72 terminates at opening 52 in ring 36 and is directed downwardly at an angle such that the light is projected onto the surface of scale 40, as is illustrated in the figure.

Figure 9:
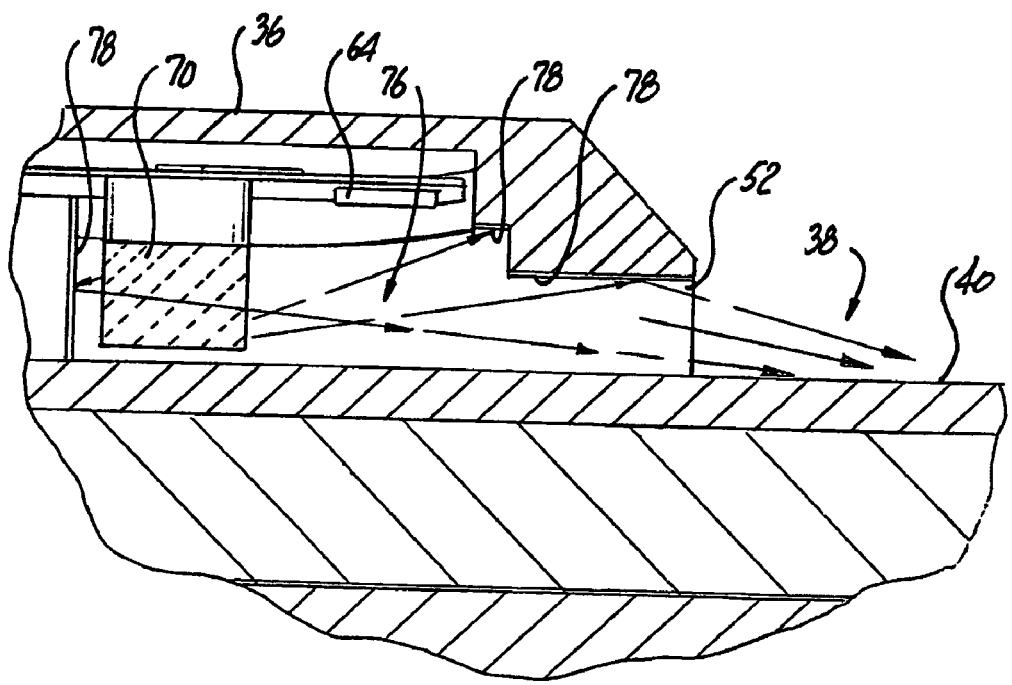
FIG. 9 is a view similar to FIG. 7 showing a third preferred embodiment of the illumination means of the present invention.

FIG. 9 illustrates a third preferred of the present invention. In this embodiment, the light sources may take the form of a side emitting LED or small incandescent bulb 70, as in the second preferred embodiment. However, in this embodiment, optical fiber 74 is replaced by an optical integrator 76 with reflective surfaces 78. The shape of integrator 76 and its reflective surfaces 78 direct the light downwardly out of opening 52 and onto the scale surface 40, as illustrated in the figure.

Scale illumination level is controlled over the range of Fully ON to Fully OFF in several steps, to provide adjustable brightness. In addition, with two sets of sources of illumination, either the primary source set may be controller on its own, or both primary and secondary source sets may be controlled.

Figure 13:
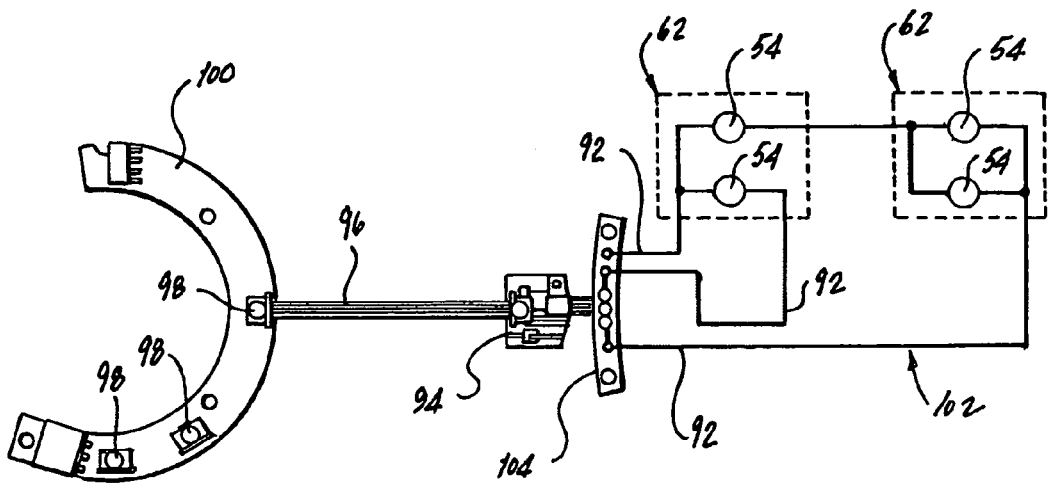
FIG. 13 is a schematic diagram of the illumination circuit.

Control of the light sources may be achieved in one of two ways. One method, as illustrated in FIGS. 12 and 13, is to use conventional lens components themselves to control the activation and intensity of the light sources. That method does not require an external illumination control circuit. In that method, the iris adjustment or other moveable lens member such as the focus ring is manipulated to initially enter the illumination level setting mode, and then set the desired level, by means of altering the position of the moveable lens member. For purposes of explanation, we will describe that method as it would be implemented using the iris adjustment.

The other method is to employ an external illumination control circuit to set the brightness level and to select one or both sources.

FIGS. 12 and 13 show that the two flexible circuits 64, for example, one circuit 64 being associated with the set of light sources on one side of window 36 and the other circuit 64 being associated with the set of light sources on the other side of window 36. Each circuit 64 is connected by wires 92 to a part 94 that is connected to move with iris scale 23 as it is rotated relative to the fixed mark. Part 94 carries one end of a FFC connecting sprung connector 96. The other end of connector 96 aligns with various conductive pads 98 on an arcuate processor board 100 as the iris scale is moved.

As scale ring 38 is rotated relative to scale cover 36, the end of connector 96 aligns with the various pads 98 spaced along the surface of the processor board. The opposite end of part 94 is connected to the light source connector board 102 by a sprung connector 104.

Each lens is individually calibrated for scale marks between the minimum and maximum value, Tmin and Tmax. The sensor settings for Tmin and Tmax are stored within an illumination control circuit, where Tmin sensor is typically a lower value then Tmax_sensor.

During the initialization of the illumination controller, the default illumination level of both sources is set, and the values Tmin_sensor and Tmax_sensor retrieved. From these, two reference values are established which are "Level lo" (Tmin_sensor+margin) and "Level_hi" (Tmax_sensor−margin), when "margin" is a small value to ensure a working window at each end of the scale movement.

During normal operation, the rotation of the iris ring is sensed and used for conventional image aperture setting purposes. However, the same iris ring can also be used to alter the illumination level of the light sources.

To set brightness level for both illumination source set simultaneously, the iris ring is moved above and then below a particular position three times within a fixed time period. This is achieved by rotating the iris ring back and forth such that the end of connector 96, which travels with the iris ring, passes over one of the pads 98 (for example the "Level hi" pad show aligned with the connector end in FIG. 12) on process board 100 three times. As soon as this sequence of movement has been detected, the illumination controller starts a timer. During the period while the timer is running, the scaled value of the setting of the iris ring is used to dynamically set the illumination level for both illumination source sets. At the end of the timer period, the illumination level remains set.

To set brightness level for only the primary illumination source, the iris ring is moved below and then above a different pad 98, such as one located at the other end of the processor board (for example, the "Level_lo" pad) three times within a fixed time period.

As soon as this sequence has been detected, the illumination controller starts a timer, and during this period, the scaled value of actual iris ring setting, (between Tmax and Tmin) is used to dynamically set the illumination level for the primary illumination source set. At the end of the timer period, the illumination level remains set.

Figure 10:
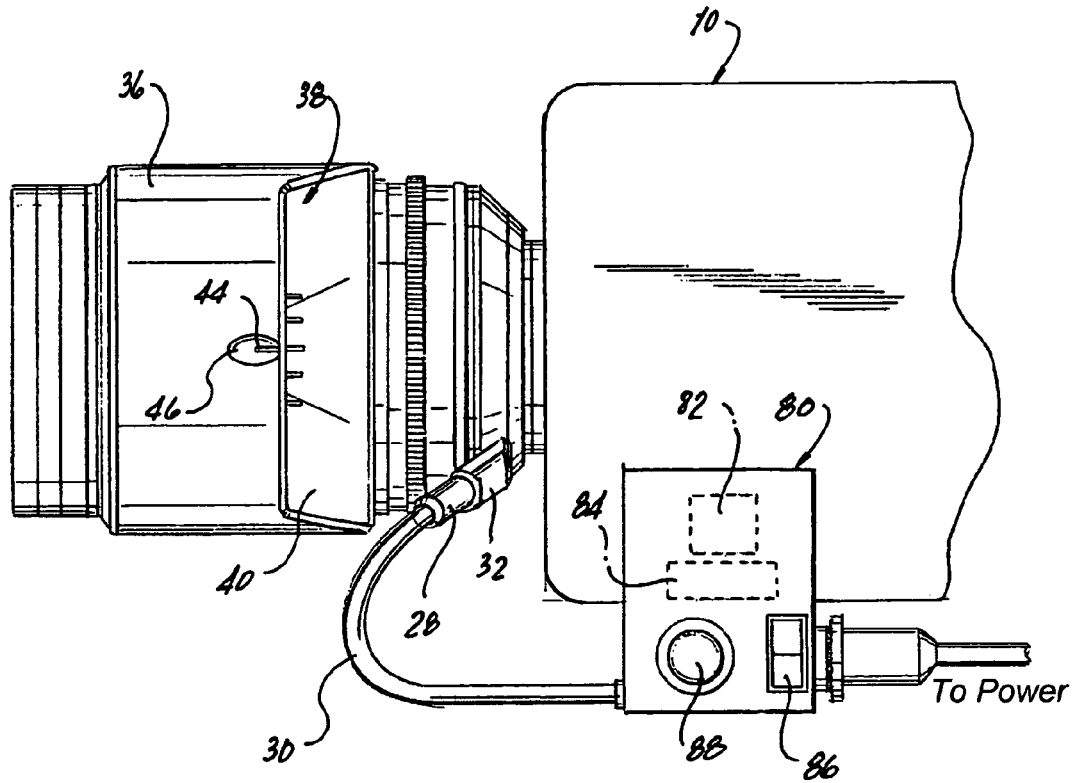
FIG. 10 is external view of the lens of the present invention and the external illumination control circuit board.

The apparatus and method of activating and controlling the light intensity using an external control circuit is illustrated in FIGS. 10, 11 and 14. As seen in FIG. 10, power cable 30 is connected to the power supply (not shown) through an external illumination controller 80. The power supply may be external to the camera or may be part of the camera. External illumination controller 80, as seen in FIG. 11, consists of an internal connector 82 which is connected to output of a microprocessor 84. The output of microprocessor 84 is regulated by on-off switch 86 and by potentiometer 88, which are connected to separate inputs to the microcontroller. Power is provided to the microcontroller from an external power source (not shown). In addition to power from the microcontroller, cable 30 now functions to permit data transfer between microcontroller 80 and the main circuit board 90 of the lens.

Connector 82 may also be connected to an external device (not shown) that is simultaneously regulated by the microprocessor output.

As seen in FIG. 11, power cable 30 is connected through socket 32 to the main circuit board 90 of the lens. Circuit board 90 is in turn connected to the camera interface, the iris resister and the light sources on the focus side and camera side of window 38.

Reference is now made to the flow chart of FIGS. 14A and 14B which illustrates the sequence of operation of the external illumination controller 80. After the connections are made as shown in the block diagram of FIG. 11, and power is passed through the illumination controller 80 and power cable to the lens, board 90 of the lens will issue a prompt to the illumination controller to indicate its internal firmware has started successfully.

The microprocessor of the external illumination controller 80 will then issue a command to the lens board to initiate the operation of the lens software. The lens board responds with a message to indicate that the software in running and awaits further instructions.

The lens operator selects position 0 or 1 on the external illumination controller LED switch 86 to indicate that either both sets of LEDs or only one side of LEDs are required to operate. This is stored by the external illumination controller microprocessor 84.

The operator now rotates the potentiometer 88. The external illumination controller microprocessor 84 monitors the movement of potentiometer 88 and issues a series of commands to the lens board to communicate: (a) the stored information regarding the LEDs to be illuminated; (b) to set LED brightness at an intermediate level; and (c) places the lens in an "LED setting mode". The lens board responds by increasing LED current to the commanded level and also issues a response to the external illumination controller microprocessor 84 that all commands have been obeyed.

The external illumination controller microprocessor 84 continues to monitor potentiometer movement and to determine the direction of rotation. From the detected movement, the external illumination controller microprocessor issues commands to increase/decrease the illumination level. The lens responds by increasing/decreasing LED current and replies that the command has been carried out. This process continues until the brightness level is as the operator requires.

Once the LED light level is satisfactory, the operator ceases changing the setting of the potentiometer, the external illumination controller micro-processor 84 ceases communicating with the lens board, the lens setting mode times out and the present LED illumination level is retained. All other normal lens software functions are now restored until such time as adjustments are again made to the external illumination controller LED switch or the potentiometer setting, or the power to the lens is interrupted.

It will now be appreciated that the present invention relates to an adjustable lens with a self-illuminated scale developed for use in producing photographic, cinematographic, and videographic images in a low light environment without degrading the quality of the images. The lens is connected to an electrical power source.

The lens includes a fixed cover and a rotating scale that is used to adjust a parameter of the lens. Fiducial markings are provided on fixed cover and scale markings are provided on the rotating scale.

The cover has an opening in the form of a cut-away portion or window aligned with the scale through which the scale markings are visible. The cover has an opaque portion and defines a recess and an opening proximate the edge of the scale that defines the cut-away portion or the window. A light source set including two light sources is situated within the recess, substantially surrounded by the opaque portion.

The light sources are connected to be energized by the same power source that powers the lens. Light from the light sources is guided through the opening in the cover edge such that the scale markings are illuminated while light from the light sources is otherwise prevented from escaping.

The activation and intensity of the light sources is controlled using the movement of the ring or through an external illumination controller While only a limited number of preferred embodiments of the present invention have been disclosed for purposes of illustration, it is obvious that many modifications and variations could be made thereto. It is intended to cover all of those modifications and variations which fall within the scope of the present invention, as defined by the following claims.

We claim:

1. An adjustable lens with a self-illuminating scale for use in photography, cinematography, or videography of the type connected to an electrical power source comprising a scale having a surface bearing scale markings moveable to adjust a parameter of the lens and a stationary opaque cover member with a reference marking mounted over said scale, said cover member having a portion at least partially defined by an edge, and through which said scale markings are visible, said edge extending in a direction generally away from said surface and having an opening, a recess situated under said cover member, adjacent said edge, a light source situated within said recess, means for connecting said light source and said power source to energize said light source, means for directing light from said light source through said edge opening in a direction along said scale surface such that said visible scale markings are illuminated by said light source, while light from said light source is otherwise substantially prevented from escaping from said cover member.

2. The lens of claim 1 wherein said connecting means comprises means for controlling the intensity of light from said light source.

3. The lens of claim 2 wherein said lens further comprises a rotatable ring and said wherein said controlling means comprises said ring.

4. The lens of claim 3 wherein the rotation of said ring normally functions to control a parameter of the lens.

5. The lens of claim 3 wherein the movement of said ring changes the function of said ring to control the intensity of the light from said light source.

6. The lens of claim 1 wherein said scale is the focus scale.

7. The lens of claim 1 wherein said cover member is the focus cover.

8. The lens of claim 3 wherein said ring is the iris ring.

9. The lens of claim 3 wherein said ring normally functions as the aperture adjustment.

10. The lens of claim 3 wherein the movement of said ring changes the function of said ring to control the activation of said light source.

11. The lens of claim 3 wherein the parameter controlled by said scale is different from the parameter normally controlled by said ring.

12. The lens of claim 1 wherein said cover member portion comprises a cut-away portion.

13. The lens of claim 1 wherein said cover member portion comprises a window.

14. The lens of claim 1 wherein said light source comprises an LED.

15. The lens of claim 1 wherein said light source comprises an incandescent bulb.

16. The lens of claim 1 wherein said light directing means comprises a transparent plastic element.

17. The lens of claim 1 wherein said light directing means comprises a light pipe.

18. The lens of claim 1 wherein said light directing means comprises an optical fiber.

19. The lens of claim 1 wherein said light directing means comprises a light channel.

20. The lens of claim 1 wherein said light directing means comprises an inclined interior surface of said light directing means.

21. The lens of claim 1 wherein said connecting means comprises switch means interposed between the power source and said light source.

22. The lens of claim 21 wherein said switch means comprises a potentiometer.

23. The lens of claim 21 wherein the lens comprises a rotatable ring and wherein said switch means is controlled by the movement of said ring.

24. The lens of claim 21 wherein said switch means is external to said lens.

25. The lens of claim 21 wherein said switch means is part of the lens.

26. The lens of claim 23 wherein the movement of said ring in a particular manner changes the function of said ring between adjusting a parameter of the lens and controlling the intensity of said light source.

27. The lens of claim 23 wherein the movement of said ring in a particular manner activates said light source.

28. The lens of claim 1 further comprising a light conducting epoxy member interposed between said light directing means and said cover member in alignment with said reference marking so as to illuminate said reference marking.

29. The lens of claim 28 wherein said reference marking is situated in a recess in said cover member.

30. The lens of claim 23 wherein said switch means comprises a part moveable with said ring, a connector having one end attached to said part and a second end, an arcuate processor board with a plurality of contact pads spaced along the surface thereof, said second end of said connector being moved along said contact pads as said ring is moved, to control said light source.

31. The lens of claim 21 wherein said switch means comprises a microprocessor controlled by a potentiometer to adjust the intensity of said light source.

32. The lens of claim 21 further comprising a second light source and wherein said switch means comprises a microprocessor controlled by a selector switch to select one or both of said light sources.

33. The lens of claim 23 further comprising a second light source and a rotatable ring, wherein said ring is movable to select one or both of said light sources.

* * * * *